United States Patent
Maeda

(10) Patent No.: US 8,908,235 B2
(45) Date of Patent: Dec. 9, 2014

(54) IMAGE READING APPARATUS

(75) Inventor: Takashi Maeda, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 902 days.

(21) Appl. No.: 12/638,522

(22) Filed: Dec. 15, 2009

(65) Prior Publication Data
US 2010/0149603 A1 Jun. 17, 2010

(30) Foreign Application Priority Data

Dec. 16, 2008 (JP) .................. 2008-319760

(51) Int. Cl.
H04N 1/40 (2006.01)
H04N 1/00 (2006.01)
H04N 1/10 (2006.01)
H04N 1/193 (2006.01)

(52) U.S. Cl.
CPC .... *H04N 1/00681* (2013.01); *H04N 2201/0081* (2013.01); *H04N 1/1017* (2013.01); *H04N 1/00795* (2013.01); *H04N 1/00718* (2013.01); *H04N 1/00758* (2013.01); *H04N 1/00737* (2013.01); *H04N 1/193* (2013.01); *H04N 1/00816* (2013.01); *H04N 1/00748* (2013.01); *H04N 1/0071* (2013.01); *H04N 1/00774* (2013.01)
USPC ........................................ 358/449

(58) Field of Classification Search
USPC ........................................ 358/449
See application file for complete search history.

(56) References Cited

U.S. PATENT DOCUMENTS

2004/0212853 A1* 10/2004 Kelly et al. .................. 358/488

FOREIGN PATENT DOCUMENTS

| JP | H05-145710 A | 6/1993 |
| JP | H05-207239 A | 8/1993 |
| JP | H11-122433 A | 4/1999 |
| JP | 2002-142084 A | 5/2002 |
| JP | 2004-032571 A | 1/2004 |
| JP | 2006-067329 A | 3/2006 |
| JP | 2008-011363 A | 1/2008 |

OTHER PUBLICATIONS

Japan Patent Office, Notification of Reasons for Refusal for Patent Application No. JP 2008-319760 (counterpart to above-captioned patent application), mailed Dec. 24, 2010.

* cited by examiner

*Primary Examiner* — Mark Zimmerman
*Assistant Examiner* — Michael Burleson
(74) *Attorney, Agent, or Firm* — Merchant & Gould PC

(57) ABSTRACT

An image reading apparatus includes: a partial pre-scanning device configured to convey a reading unit in an edge detection area and causes the reading unit to execute a reading operation in the edge detection area, the edge detection area being a partial area within a scannable area on a platen, and a detecting device configured to detect a plurality of edge pixels on a basis of image data, the plurality of edge pixels representing a side of a document, the image data being outputted by the reading unit that reads the edge detection area through execution of the reading operation by the partial pre-scanning device. Upon the plurality of edge pixels not detected on the basis of the image data, the partial pre-scanning device moves the edge detection area in a conveying direction of the reading unit and causes the reading unit to execute the reading operation.

7 Claims, 18 Drawing Sheets

FIG.12

| LENGTH OF LINE SEGMENT CONNECTING BOTTOM LEFT CORNER AND BOTTOM RIGHT CORNER OF DOCUMENT ||  DOCUMENT SIZE |
|---|---|---|
| LOWER LIMIT | UPPER LIMIT | |
| GREATER THAN 0 and LESS THAN 50 mm ||  |
| EQUAL TO OR GREATER THAN 50 mm (VISIT CARD SIZE) | LESS THAN 69 mm | B9 |
| EQUAL TO OR GREATER THAN 69 mm | LESS THAN 94 mm | B8 |
| EQUAL TO OR GREATER THAN 94 mm | LESS THAN 104 mm | L <br> JAPAN: POSTCARD <br> U.S.A.: 4 in. by 6 in. |
| EQUAL TO OR GREATER THAN 104 mm | LESS THAN 132 mm | JAPAN: 2L <br> U.S.A.: 5 in. by 7 in. |
| EQUAL TO OR GREATER THAN 132 mm | LESS THAN 153 mm | A5 |
| EQUAL TO OR GREATER THAN 153 mm | LESS THAN 213 mm | A4 |
| EQUAL TO OR GREATER THAN 213 mm | LESS THAN 220.9 mm | Letter |
| EQUAL TO OR GREATER THAN 220.9 mm | LESS THAN 262 mm | B4 |
| EQUAL TO OR GREATER THAN 262 mm | LESS THAN 284.4 mm | Ledger |
| EQUAL TO OR GREATER THAN 284.4 mm || A3 |

IMAGE READING APPARATUS

CROSS REFERENCE TO RELATED APPLICATION

This application claims priority from Japanese Patent Application No. 2008-319760 filed on Dec. 16, 2008. The entire content of this priority application is incorporated herein by reference.

TECHNICAL FIELD

The present invention relates to an image reading apparatus.

BACKGROUND

A first known document-size detecting unit reads a position several millimeters or more than ten millimeters apart from an end of a platen glass (a platen) in a sub-scanning direction using a CCD image sensor and detects a document size.

However, in a case of the document not located in an area within several millimeters or more than ten millimeters from the end of the platen glass in the sub-scanning direction, the first known document-size detecting unit cannot determine the document size.

Thus, there is a need for an image reading apparatus that can determine the document size with a simpler structure even when the document is located apart from the end of the platen.

SUMMARY

An aspect of the present invention is an image reading apparatus including: a platen for a document to be placed thereon; a reading unit configured to be conveyed along the platen and to read the document; a partial pre-scanning device configured to convey the reading unit in an edge detection area and causes the reading unit to execute a reading operation in the edge detection area, the edge detection area being a partial area within a scannable area on the platen, the scannable area being for the reading unit to be capable of reading; a detecting device configured to detect a plurality of edge pixels on a basis of image data, the plurality of edge pixels representing a side of the document, the image data being outputted by the reading unit that reads the edge detection area through execution of the reading operation by the partial pre-scanning device; and a determining device configured to determine a size of the document on a basis of the plurality of edge pixels detected by the detecting device. Upon the plurality of edge pixels not detected on the basis of the image data by the detecting device, the partial pre-scanning device moves the edge detection area in a conveying direction of the reading unit and causes the reading unit to execute the reading operation.

BRIEF DESCRIPTION OF THE DRAWINGS

FIG. 12 is a correspondence table between document sizes and distances.

DETAILED DESCRIPTION

Illustrative Aspect

<First Illustrative Aspect>

A first illustrative aspect in accordance with the present invention will be described with reference to FIGS. 1 through 11.

(1) Configuration of Image Reading Apparatus

Figure 1:
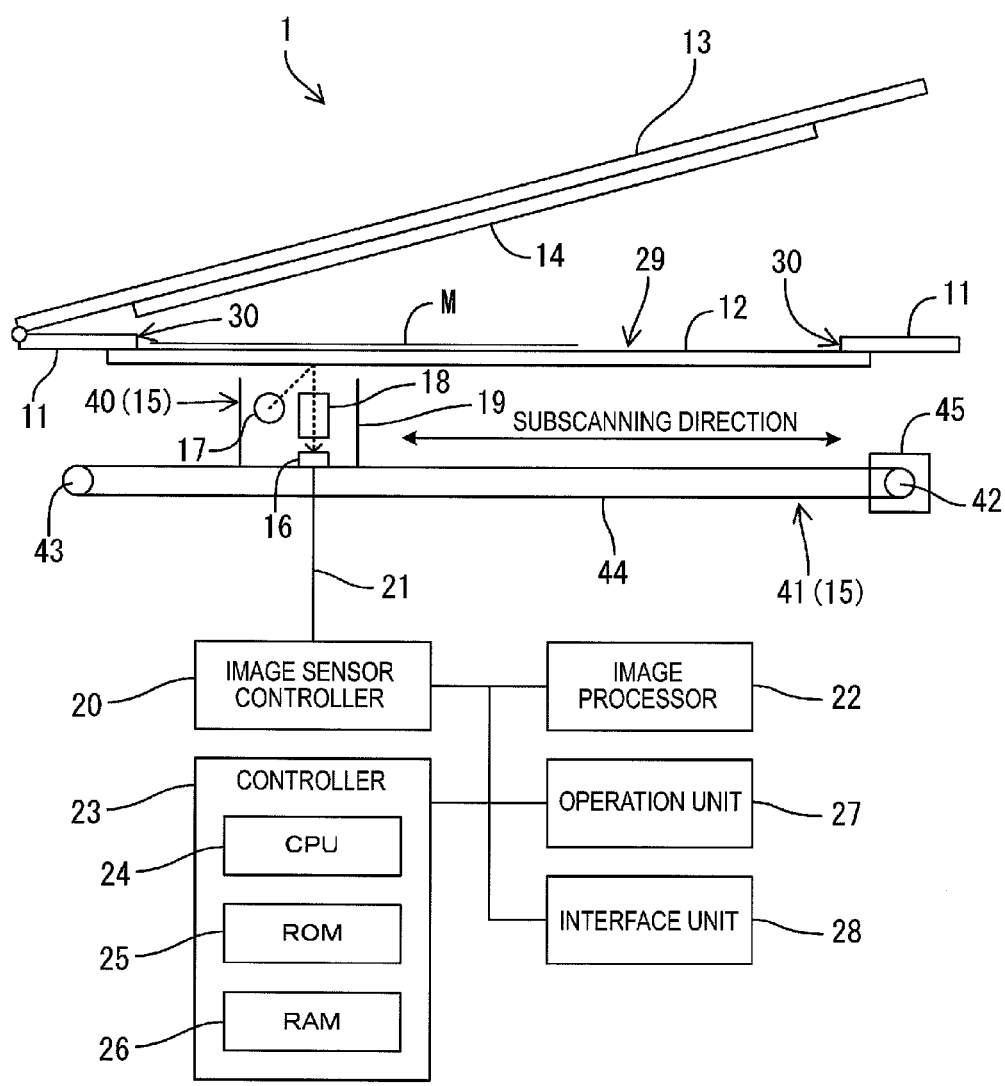
FIG. 1 is a schematic diagram of an image reading apparatus of an illustrative aspect in accordance with the present invention.

FIG. 1 is an illustration of an image scanner 1 (an illustration of an image reading apparatus) of a flat-bed type. The image scanner 1 reads a document using a CIS (Contact Image Sensor).

A casing 11 (only its part is illustrated in FIG. 1) includes an opening portion 30 that forms an opening 29. The opening 29 is closed from the inside of the casing 11 with a platen glass 12 (an illustration of a platen). The opening portion 30 that forms the opening 29 has an inner peripheral face used as a frame for a side of the document M to be butted so that the document M is positioned on the platen glass 12.

A document cover 13 is connected with the casing 11 so as to turn between an open state and a closed state. Where the document cover 13 is in the open state, the platen glass 12 is open. Where the document cover 13 is in the closed state, the platen glass 12 is closed. The document cover 13 has a white document mat 14. The document mat 14 holds down the document M placed on the platen glass 12.

A reading device 15 includes a reading unit 40, a conveying mechanism 41 (an illustration of a partial pre-scanning device) that conveys the reading unit 40 along the platen glass 12, etc. The reading unit 40 includes a linear image sensor 16, a light source 17, a rod lens array 18, a carriage 19, etc. The linear image sensor 16 has a plurality of light receiving elements arranged in straight line in a direction perpendicular to the figure. The light source 17 has LEDs in three (R, and B) colors, etc. The rod lens array 18 focuses the reflection light reflected from the document M on the light receiving elements so as to form an image. The carriage 19 carries the linear image sensor 16, the light source 17, and the rod lens array. The conveying mechanism 41 includes a drive roller 42, a driven roller 43, a timing belt 44 stretched between these rollers, a stepping motor 45, a decelerating mechanism (not illustrated), etc. The decelerating mechanism decelerates the rotational drive force of the stepping motor 45 and transfers the decelerated force to the drive roller 42.

An image sensor controller 20 (an illustration of the partial pre-scanning device) is configured as an ASIC and is connected to the reading device 15 via a flexible flat cable 21. The image sensor controller 20 controls the reading unit 40 and the conveying mechanism 41 while performs processing (e.g. gain adjustment, A/D conversion, etc.) of an image data outputted from the linear image sensor 16 and stores the data in a RAM 26.

An image processor 22 (an illustration of a detecting device) is configured as an ASIC. The image processor 22 performs processing (e.g. gamma correction, shading correction, denoising, color balance adjustment, enlargement/reduction, color space conversion, etc.) of the image data stored in the RAM 26.

A controller 23 (an illustration of the partial pre-scanning device, the detecting device, a determining device, a notifying device, a selecting device, a specifying device, and a corner detecting device) includes a CPU 24, a ROM 25, the RAM 26, etc. The controller 23 controls each part of the image scanner 1. When reading is instructed via an operation unit 27, the CPU 24 controls each part of the image scanner 1 to read the document, compresses the image data processed with the image processor 22 in a predetermined compression format (e.g. JPEG etc.), and outputs the compressed image data toward an interface unit 28.

The operation unit 27 (an illustration of the notifying device, the selecting device, and the specifying device) includes a plurality of buttons, an LCD, etc. The user can input various instructions (e.g. document reading etc.) and settings by, for example, operating the buttons while viewing a window displayed in the LCD.

In this illustrative aspect, the user can select whether to perform "Fit to Page" for generating an image data that represents only the document. If the "Fit to Page" is selected, the CPU 24 identifies an area where the document exists from a size and a inclination of the document placed on the platen glass 12 and reads the identified area alone so as to generate the image data representing only the document.

The interface unit 28 includes a USB interface, a network interface, etc.

Figure 2:
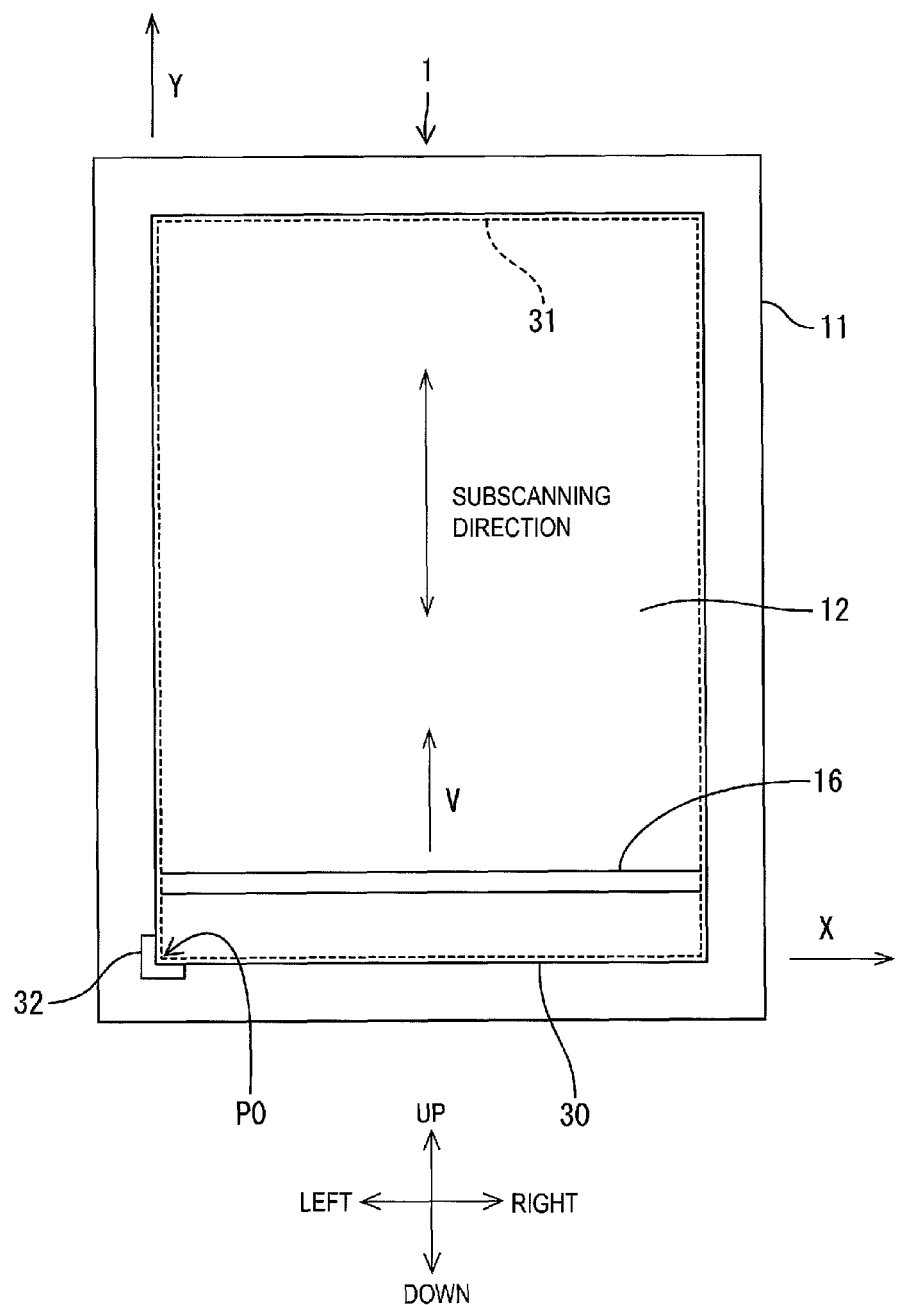
FIG. 2 is a schematic diagram of the image reading apparatus of the illustrative aspect in accordance with the present invention, the image reading apparatus being viewed from the above.

For reasons of expediency, in this illustrative aspect, the main scanning direction illustrated in FIG. 2 (the extending direction of the linear image sensor 16) is defined as the lateral direction, while the sub-scanning direction is defined as the up-and-down direction. At a time of document reading, the image scanner 1 reads while conveying the reading unit 40 upwardly as illustrated by the arrow X.

A rectangular area 31 indicated by a dashed line is an illustration of an area (a scannable area) that the reading device 15 can read. In this illustrative aspect, the scannable area 31 is set a several millimeters (3 millimeters in this illustrative aspect) apart inwardly from the inner peripheral face of the opening portion 30. That is, an area within 3 millimeters from the inner peripheral face is not read.

A mark 32 indicates a position for a corner of the document to be positioned. In this illustrative aspect, the mark 32 is provided such that the document is positioned in the bottom left corner of a frame 30.

The image scanner 1 sets an X-Y coordinate system with the origin P0 in a bottom left corner of the scannable area 31 on the platen glass 12 (a corner nearest to the bottom left corner of the frame 30), with the X-axis in the main scanning direction, and with the Y-axis in the sub-scanning direction. The image scanner 1 controls document reading using this X-Y coordinate system.

(2) Overview of Document-Size Determination Process

A document-size determination process for determining the document size will hereinafter be overviewed.

Figure 3:
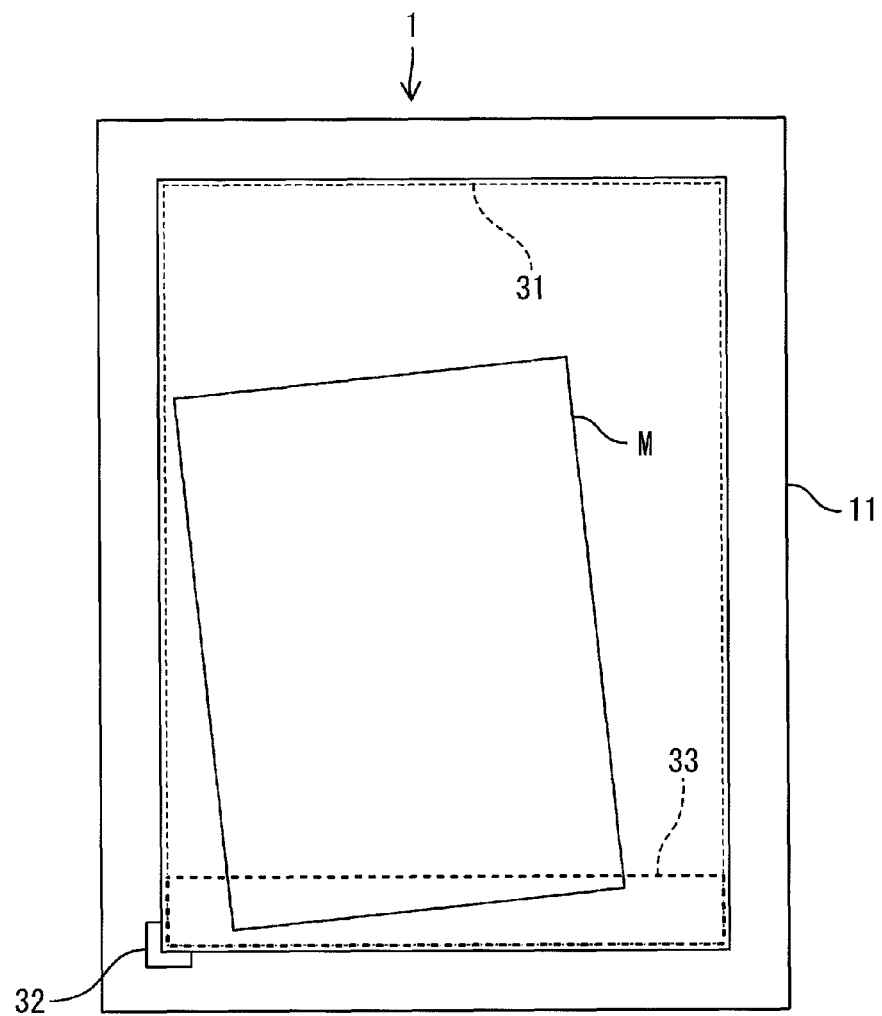
FIG. 3 is a schematic diagram of the image reading apparatus of the illustrative aspect in accordance with the present invention, the image reading apparatus being viewed from the above.

FIG. 3 is a view illustrating the image scanner 1 in a state where the document M is placed in a inclined state thereon.

First, the image scanner 1 reads a partial area (hereinafter referred to as an "edge detection area") 33 in the scannable area 31, generates the image data, and detects a plurality of edge pixels representing a side of the document M in the generated image data.

Note here that an edge pixel is a place (pixel) where the pixel density acutely changes. When the document M is being read, a shadow is produced along the side of the document M due to the thickness of the document M. The pixel density acutely changes between a pixel that has read this shadow and a pixel that has read the white document mat 14. This acute difference becomes the plurality of edge pixels that represents the side of the document M. The image scanner 1 detects this plurality of edge pixels representing the side of the document M.

Next, based on the plurality of edge pixels representing the side of the document M, the image scanner 1 detects two corners of the document M and, from a distance between of the detected two corners, determines the size of the document M.

(2-1) Edge Detection Area

As illustrated in FIG. 3, the edge detection area 33 is a rectangular area having a same width in the main scanning direction with a width of the scannable area 31 in the main scanning direction. The initial position of the edge detection area 33 is set so that the bottom, right, and left sides thereof overlap the bottom, right, and left sides, respectively, of the scannable area 31.

In this illustrative aspect, a width of the edge detection area 33 in a conveying direction (sub-scanning direction) is set at 3 cm. Unless the document M is in an extremely inclined state, it is highly possible for a distance in the conveying direction between one corner and the other corner of the document M to be within a certain fixed distance, the other corner being nearer one of two corners to the one corner, the two corners being adjacent to the one corner. In a case where this certain fixed distance is set as the width in the conveying direction of the edge detection area 33, it is highly possible for the scanner 1 to be capable of detecting the two corners of the document M by a single cycle of reading. In this illustrative aspect, this certain fixed distance is estimated to be 3 cm and, accordingly, the width of the edge detection area 33 in the conveying direction is set at 3 cm.

(2-2) Detection of the Plurality of Edge Pixels Representing Side of Document

Next, a method of detecting the plurality of edge pixels representing the side of the document in the image data generated by reading the edge detection area 33 will be illustratively described. Note that, hereinafter, the plurality of edge pixels representing the bottom side, the right side, and the left side of the document will be referred to as a leading edge, a right edge, and a left edge, respectively. An illustrative case of detecting the leading edge (including the plurality of edge pixels) will hereinafter be described.

Figure 4A:
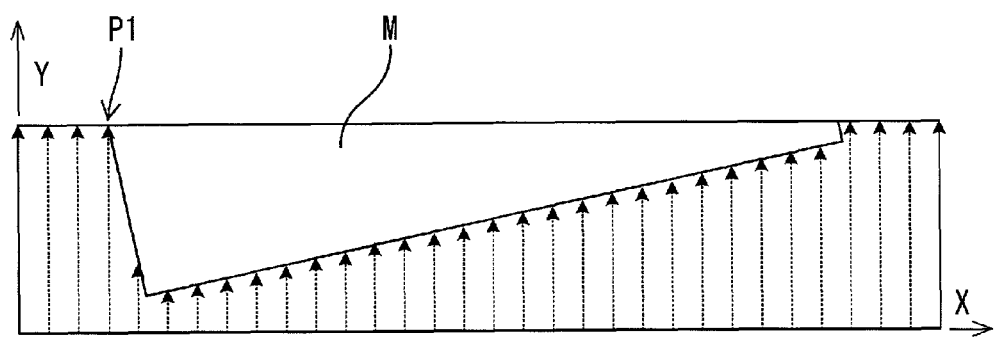
FIG. 4A is a view illustrating an edge detection of the illustrative aspect in accordance with the present invention.

FIG. 4A is a view for explaining detection of the leading edge.

First, the image scanner 1 applies a differential filter to the image data generated by reading the edge detection area 33, and thus generates a differential image representing edge pixels of the image data as illustrated in FIG. 4A.

Next, the image scanner 1 sets a bottom left pixel (a pixel corresponding to the origin P0) in the differential image as the starting position. Then, the image scanner 1 compares the pixels one by one in the Y-axial direction with a predetermined threshold. When a pixel (the edge pixel) having the pixel density equal to or greater than the predetermined threshold is found, the image scanner 1 terminates detection at the position and stores the coordinates of the found edge pixel in the RAM 26. Note that, in a case where no edge pixel is found and the image scanner 1 reaches the end of the differential image in the Y-axial direction, the image scanner 1 determines that no edge pixel is found and stores no coordinates. The image scanner 1 repeats this processing while moving by 8 pixels in the X-axial direction until the image scanner 1 reaches an end in the X-axial direction.

Next, the image scanner 1 performs a straight-line approximation of the coordinates stored in the RAM 26 and thus calculates a straight line representing the bottom side of the document M. The manner of calculating the straight line differs depending on whether or not the document M is inclined.

In a case of the document M inclined to the left as illustrated in FIG. 4A, the leading edge and the left edge is detected. In this case, the stored Y-coordinate starts from an initially stored coordinate P1, monotonically decreases, and turns to monotonic increase at a certain point in the progress.

Figure 4B:
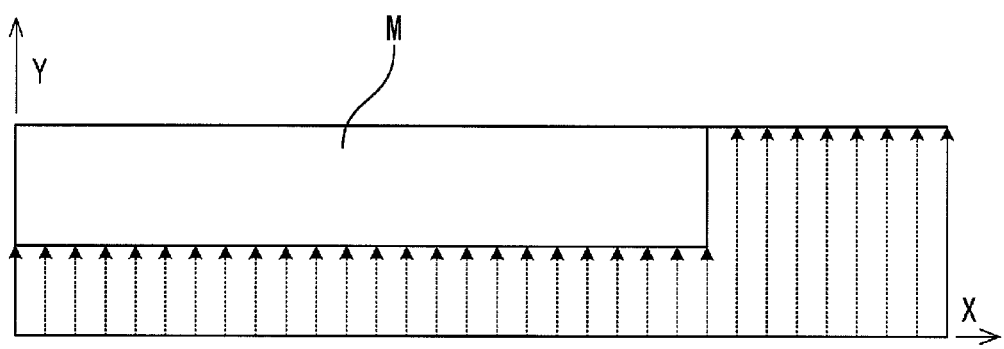
FIG. 4B is a view illustrating the edge detection of the illustrative aspect in accordance with the present invention.

FIG. 4B illustrates a case of the document not inclined. In the case of the document not inclined, the leading edge alone is detected. In this case, the stored Y-coordinate neither monotonically decreases nor monotonically increases or, where the document M is slightly inclined, the Y-coordinate slightly monotonically decreases or monotonically increases. In each case, where the leading edge alone is detected, the Y-coordinate does not turn from monotonic decrease to monotonic increase.

Accordingly, it can be determined as follows: in the case of the Y-coordinate turning from the monotonic decrease to monotonic increase, the leading edge and the left edge have been detected; while, in the case of the Y-coordinate not turning from the monotonic decrease to monotonic increase, the leading edge alone has been detected.

In the case where the leading edge and the left edge have been detected, the image scanner 1 performs straight-line approximations of the coordinates in each of a section where the Y-coordinate monotonically decreases and a section where the Y-coordinate monotonically increases. Thus, the image scanner 1 calculates respective straight lines in these two sections. Then, the image scanner 1 assumes the one having the less inclination from the bottom side of the scannable area 31 to be a straight line representing the bottom side of the document. That is, only the edge pixels located on the straight line representing the bottom side of the document are detected as the leading edge. On the other hand, if the leading edge alone is detected, the stored edge pixels, as they are, are detected as the leading edge of the document.

Furthermore, in a case of the document positioned with the bottom side butted at the bottom side of the frame 30 (see Case 4, which will be described below) and, accordingly, the bottom side of the document not read, the edge pixels in the image formed on the document are detected. The edge pixels in the image on the document rarely form in straight line. Accordingly, if the detected edge pixels do not form in straight line, the image scanner 1 determines the leading edge not to have been detected.

While the case of detecting the leading edge is hereinbefore illustratively described, the right edge and the left edge can also be detected in a similar manner.

(2-3) Detection of Two Corners of Document

A method of detecting the two corners of the document on a basis of the detected edges will now be described by illustrating several cases.

(2-3-1) Case 1

Figure 5A:
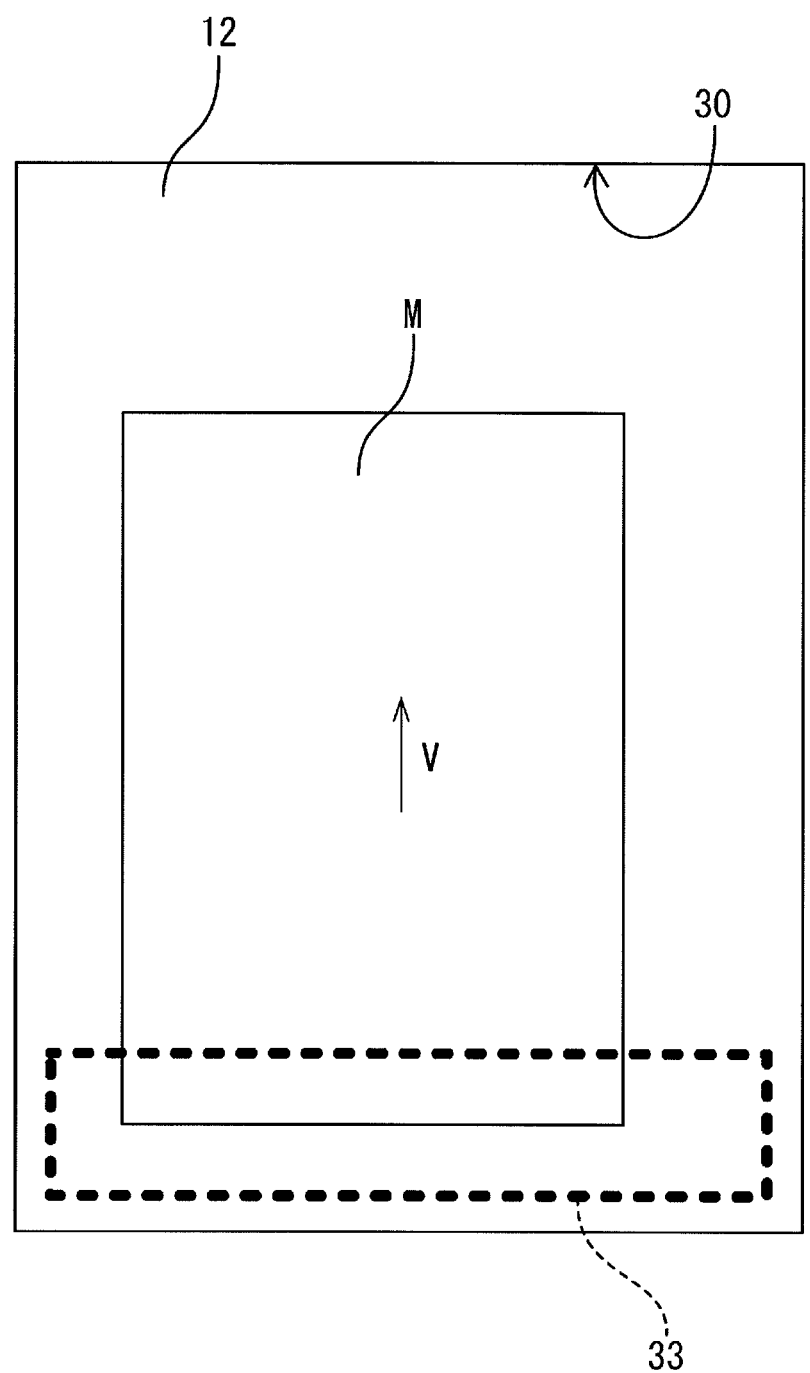
FIG. 5A is a view of the illustrative aspect in accordance with the present invention, the view illustrating a placement of a document.

Case 1 is illustrated in FIG. 5A. In this illustration, the document M is placed in a position apart from the bottom side of the frame 30 in the conveying direction V. Each of the bottom, the right, and the left sides of the document M is within the scannable area 31. In this case, the bottom, the right, and the left sides of the document M are detected.

In this case, the image scanner 1 obtains three straight lines by the straight-line approximations of each of the plurality of edge pixels representing the sides. Then, the image scanner 1 assumes two intersections of the three straight lines to be a bottom right corner and a bottom left corner of the document M.

(2-3-2) Case 2

Figure 5B:
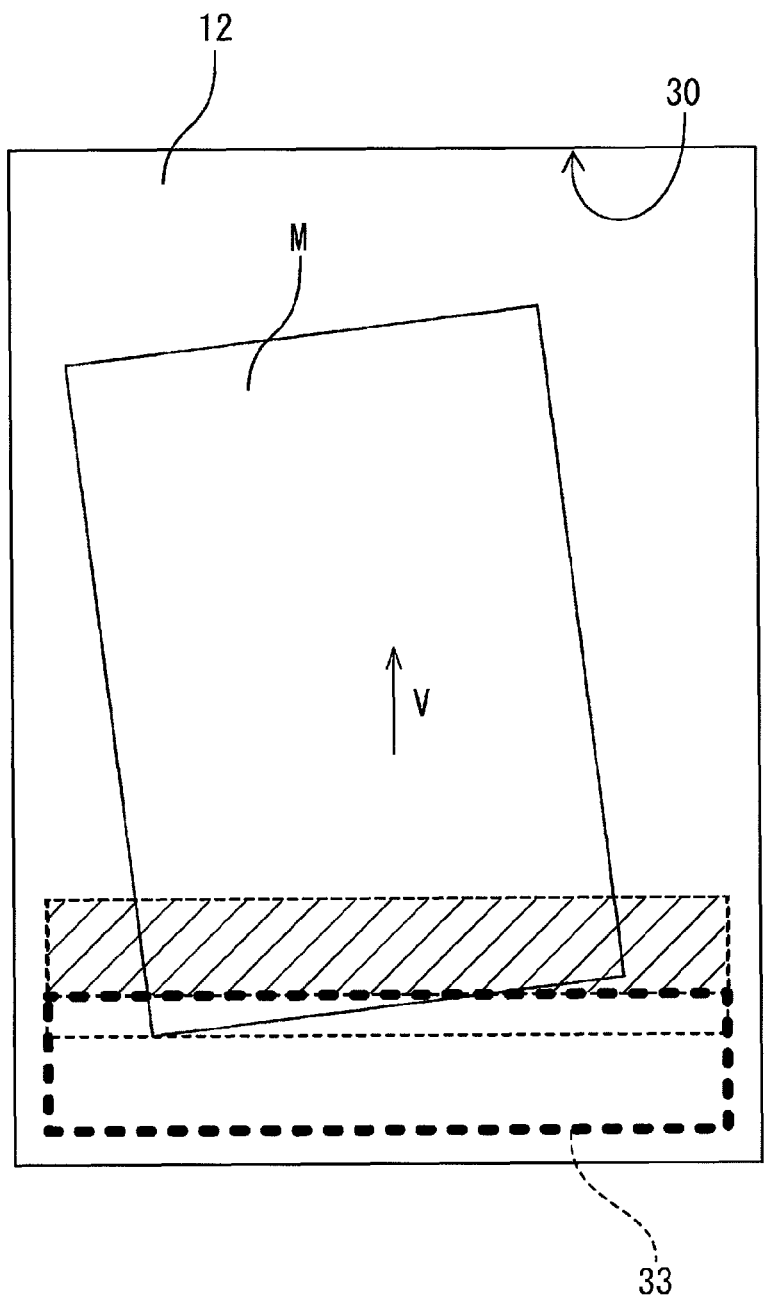
FIG. 5B is a view of the illustrative aspect in accordance with the present invention, the view illustrating a placement of the document.

Case 2 is illustrated in FIG. 5B. In this illustration, the document M is placed in a inclined state at a position apart from the bottom side of the frame 30 in the conveying direction V. The bottom right corner of the document M is outside the edge detection area 33.

In this case, the leading edge and the left edge of the document M is detected. Accordingly, the image scanner 1 obtains two straight lines by the straight-line approximations of each of the leading edge (edge pixels) of the document M and the edge (edge pixels) representing the left side of the document M. Then, the image scanner 1 assumes an intersection of the two straight lines to be the bottom left corner of the document M. On the other hand, because the right edge of the document M is not detected, the bottom right corner of the document M is not detected.

In a case where at least one corner is detected, the image scanner 1 additionally reads an area that is adjacent to the present edge detection area 33 and has not been read yet. Then, the image scanner 1 detects the other corner.

In this case, in this illustrative aspect, the image scanner 1 reads the area (the area illustrated by oblique lines in the figure) that is located within 3 cm (width of the edge detection area) in the conveying direction V from the detected bottom left corner and has not been read yet. In other words, in a case where the edge detection area 33 is moved in the conveying direction so that the bottom side of the edge detection area 33 overlaps the bottom left corner of the document, only the area that has not been read within the edge detection area 33 after movement is additionally read. As described above, unless the document M is in an extremely inclined state, it is highly possible for the distance in the conveying direction between one corner and the other corner of the document M to be within 3 cm, the other corner being nearer one of two corners to the one corner, the two corners being adjacent to the one corner. Accordingly, by reading the unread area in the area for 3 cm in the conveying direction from the detected corner, the possibility of detecting the other corner while reading less additional area is higher.

Note that, while description is omitted in the foregoing Case 1, two corners are detected in Case 1, and thus, Case 1 corresponds to a case of "detection of at least one corner". Accordingly, in this illustrative aspect, the unread area is additionally read also in the case of Case 1.

(2-3-3) Case 3

Figure 5C:
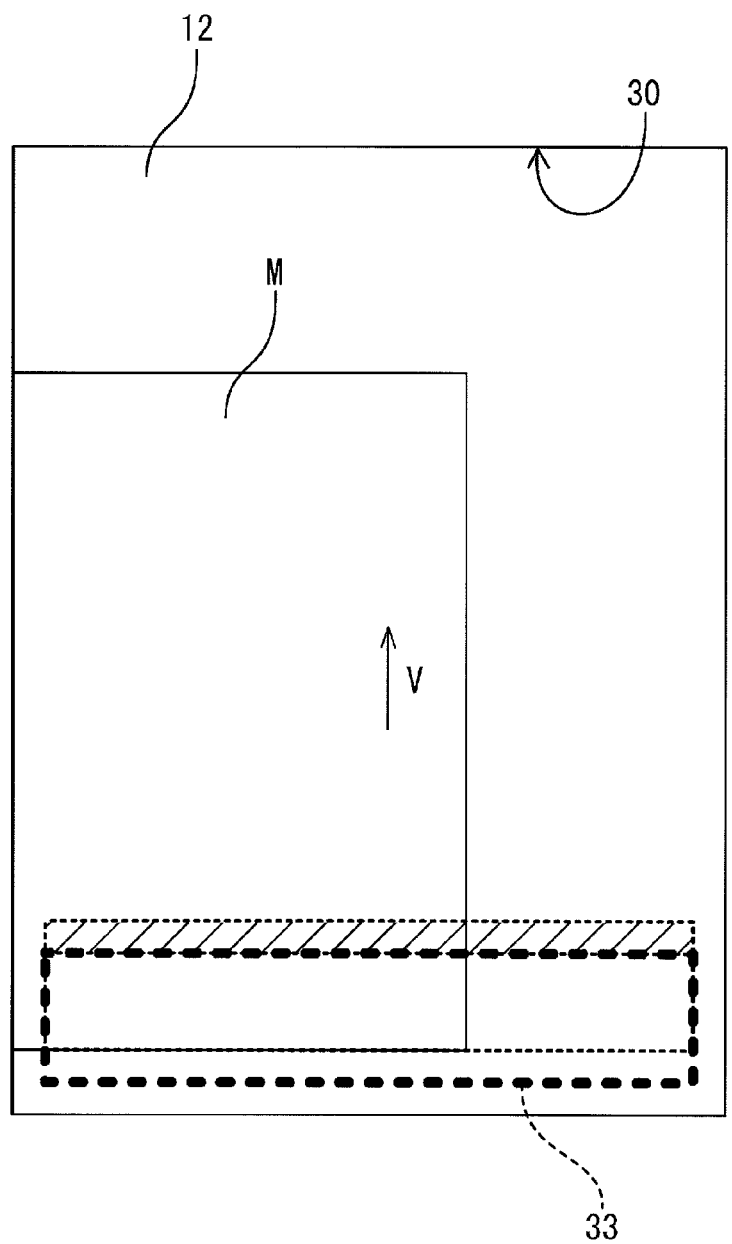
FIG. 5C is a view of the illustrative aspect in accordance with the present invention, the view illustrating a placement of the document.

Case 3 is illustrated in FIG. 5C. In this illustration, the document M is positioned at a position apart from the bottom side of the frame 30 in the conveying direction V. The left side of the document M is butted at an inner peripheral face of a left side of the frame 30. Because the left side of the document M is butted at the inner peripheral face of the left side of the frame 30, the document M is placed on the platen glass without being inclined.

In this case, the bottom right corner of the document M is detected, while the bottom left corner of the document M is not detected. This case also corresponds to the case of "detection of at least one corner", and accordingly, the image scanner 1 additionally reads the area that is adjacent to the present edge detection area 33 and has not been yet read and detects the bottom left corner within the read area.

However, because the bottom left corner is not located in the scannable area 31, the bottom left corner is not detected even through the additional reading of the area. In the case of the bottom left corner not detected within the read area, the image scanner 1, on a supposition that the left side of the document M is butted at the inner peripheral face of the left side of the frame 30, estimates the intersection of a straight line obtained by the straight-line approximation of the edge (edge pixels) representing the bottom side of the document M and the left side of the frame 30 to be the bottom left corner of the document M.

(2-3-4) Case 4

Figure 5D:
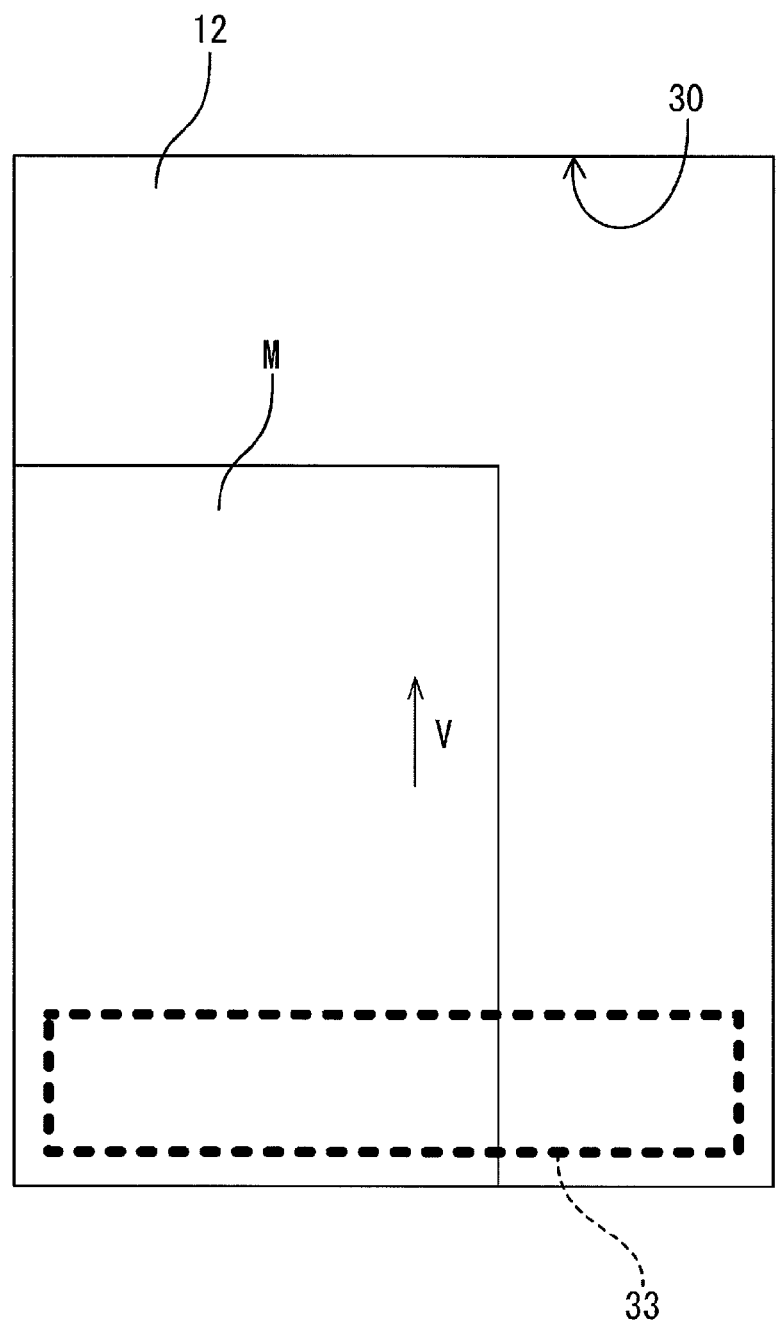
FIG. 5D is a view of the illustrative aspect in accordance with the present invention, the view illustrating a placement of the document.

Case 4 is illustrated in FIG. 5D. In this illustration, the document M is placed on the platen glass 12 with the left side butted at the inner peripheral face of the left side of the frame 30 and with the bottom side butted at an inner peripheral face of a bottom side of the document M. That is, the bottom left corner of the document M is positioned in the bottom left corner of the frame 30. In this case, only the right edge of the document M is detected, while neither of the leading edge of the document M nor the left edge of the document M is detected.

In order that a corner of the document M be detected, The edges of at least two sides are required. Accordingly, in the case where the right edge alone is detected, even a single corner cannot be detected.

In the case where the right edge alone is detected as above, the image scanner 1, on a supposition that the bottom left corner of the document M is positioned in the bottom left corner of the frame 30, estimates the intersection of the straight line obtained by the straight-line approximation of the right edge (edge pixels) and the bottom side of the frame 30 to be the bottom right corner of the document M and estimates the bottom left corner of the frame 30 to be the bottom left corner of the document M.

(2-4) Case of the Document not Located within the Edge Detection Area

Figure 6:
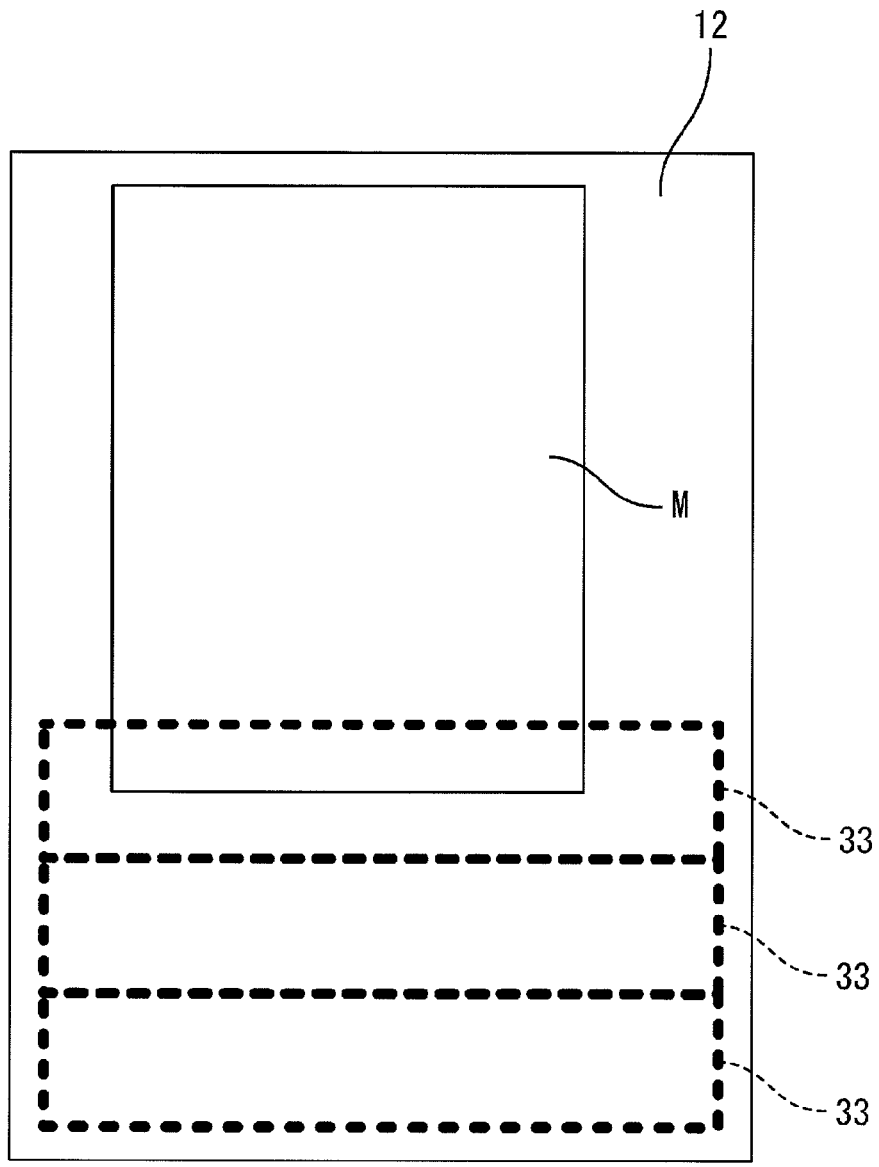
FIG. 6 is a view of the illustrative aspect in accordance with the present invention, the view illustrating a placement of the document.

FIG. 6 is a view illustrating a case where no side of the document M is located within the edge detection area 33. The document M is not always partially placed within the edge detection area 33; the document M can be possibly placed in a position apart from the bottom side of the platen glass 12. In the case where no side of the document M is located within the edge detection area 33, no edge representing the side of the document M is detected. In the case where no edge representing the edge of the document M is detected, the image scanner 1 detects the edge by repeating reading while moving the edge detection area 33 until the image scanner 1 detects the edge representing at least one side of the document M. The manner of detecting two corners in the case where the edge is detected is similar to the foregoing case.

Furthermore, in a case of no document placed, no edge is detected through repeated reading. Accordingly, the readable area 31 is read to the end, and reading is terminated.

Here, even in the case of the document M placed on the platen glass 12, the edge representing the side of the document is not always detected; in a case where the shadow produced along the side of the document is faint, it is possible that no edge is detected. That is, detection of no edge representing the side of the document does not prove that no document is placed on the platen glass 12.

Accordingly, in the case of no edge detected through the repeated reading, the image scanner 1 notifies the user about detection of no document size and causes the user to select whether to execute reading. In a case where execution of reading is selected, the image scanner 1 causes the user to specify the document size and reads an area corresponding to the specified size.

(3) Details of Document-Size Determination Process

Details of the document-size determination process will hereinafter be described.

(3-1) General Flow

First, a general flow of the document-size determination process will be described.

Figure 7A:
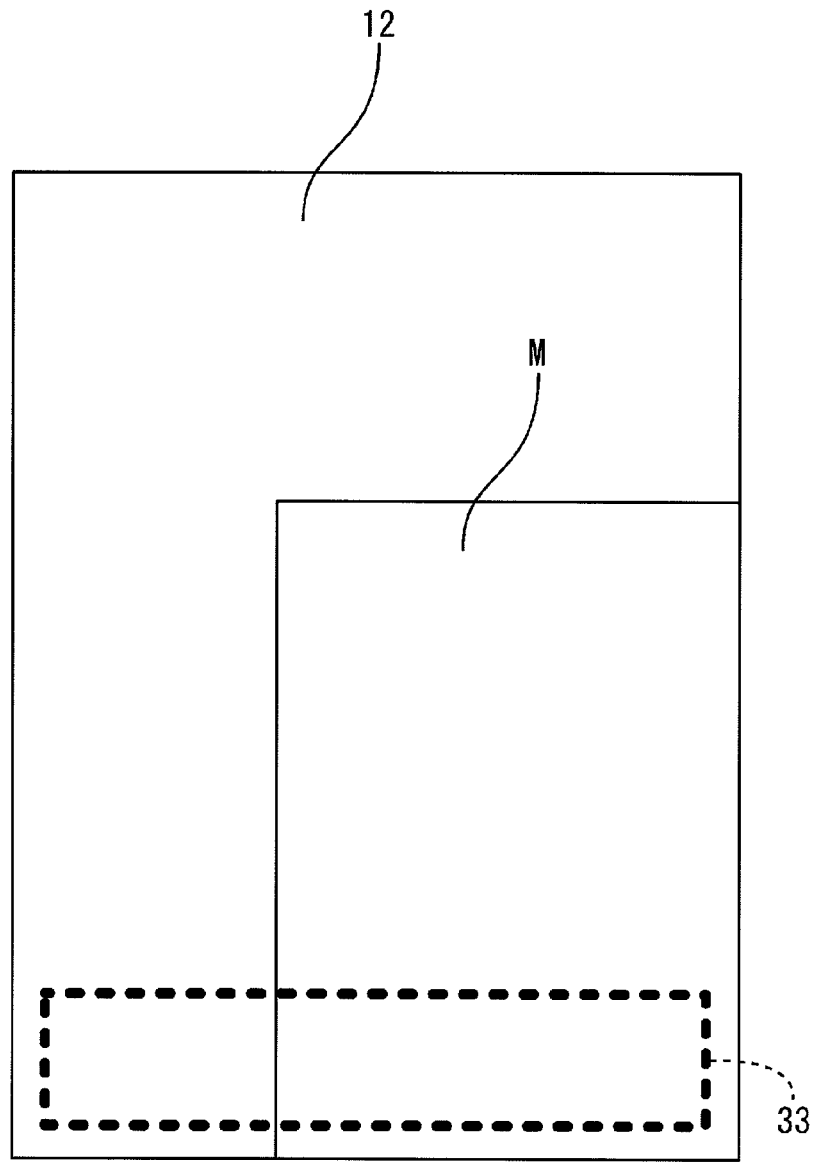
FIG. 7A is a view of the illustrative aspect in accordance with the present invention, the view illustrating a placement of the document.
Figure 7B:
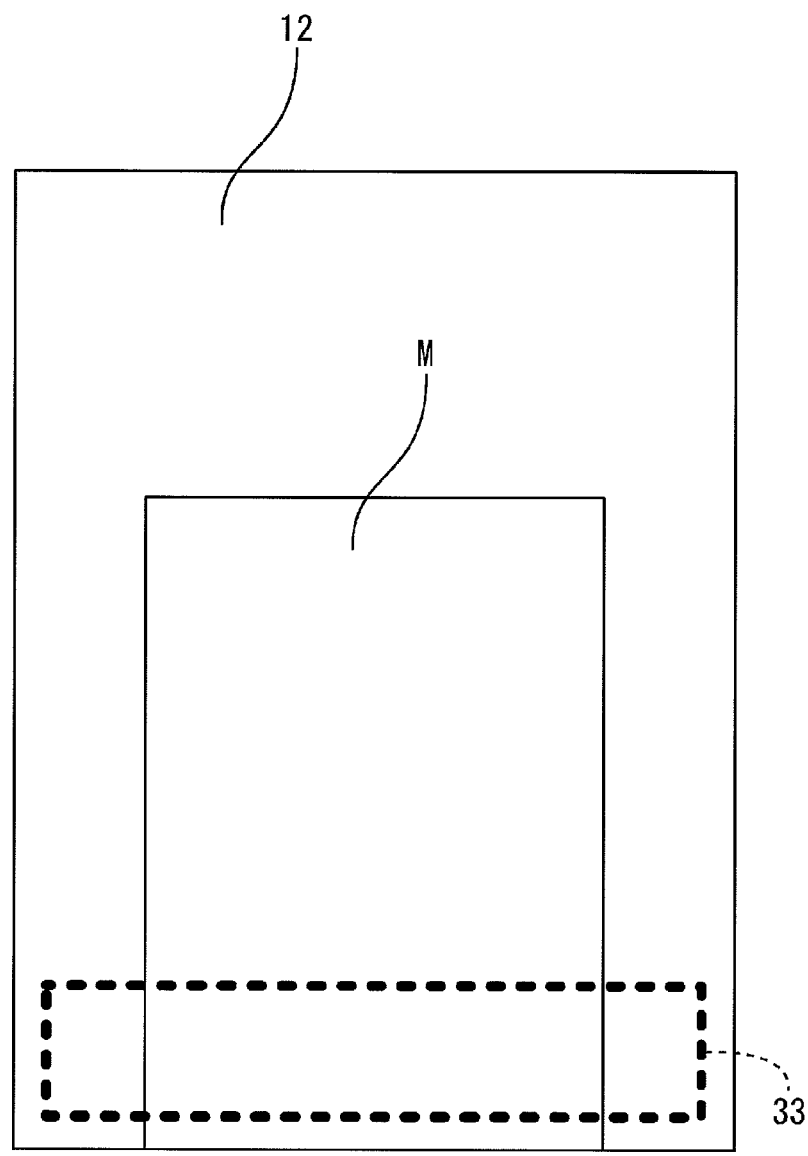
FIG. 7B is a view of the illustrative aspect in accordance with the present invention, the view illustrating a placement of the document.
Figure 7C:
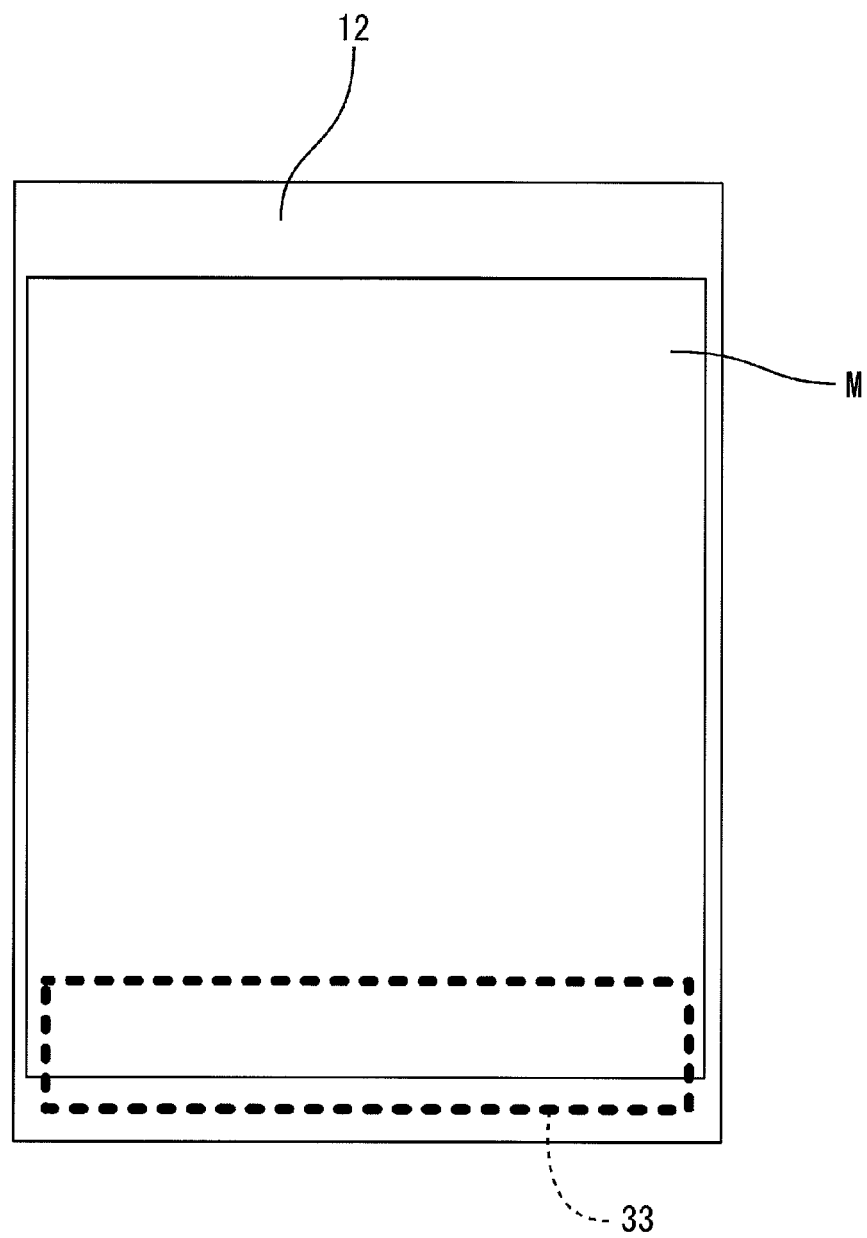
FIG. 7C is a view of the illustrative aspect in accordance with the present invention, the view illustrating a placement of the document.

Note that, for easier comprehension, the description will except the following cases: a case of the document M positioned on the platen glass 12 with the right side butted at the inner peripheral face of the right side of the frame 30 as illustrated in FIG. 7A; a case of the document M positioned on the platen glass 12 with the bottom side butted at the inner peripheral face of the bottom side of the frame 30 while the left side and the right side within the readable area 31 as illustrated in FIG. 7B; and a case of the document M with both the right side and the left side outside the readable area 31 as illustrated in FIG. 7C.

Figure 8:
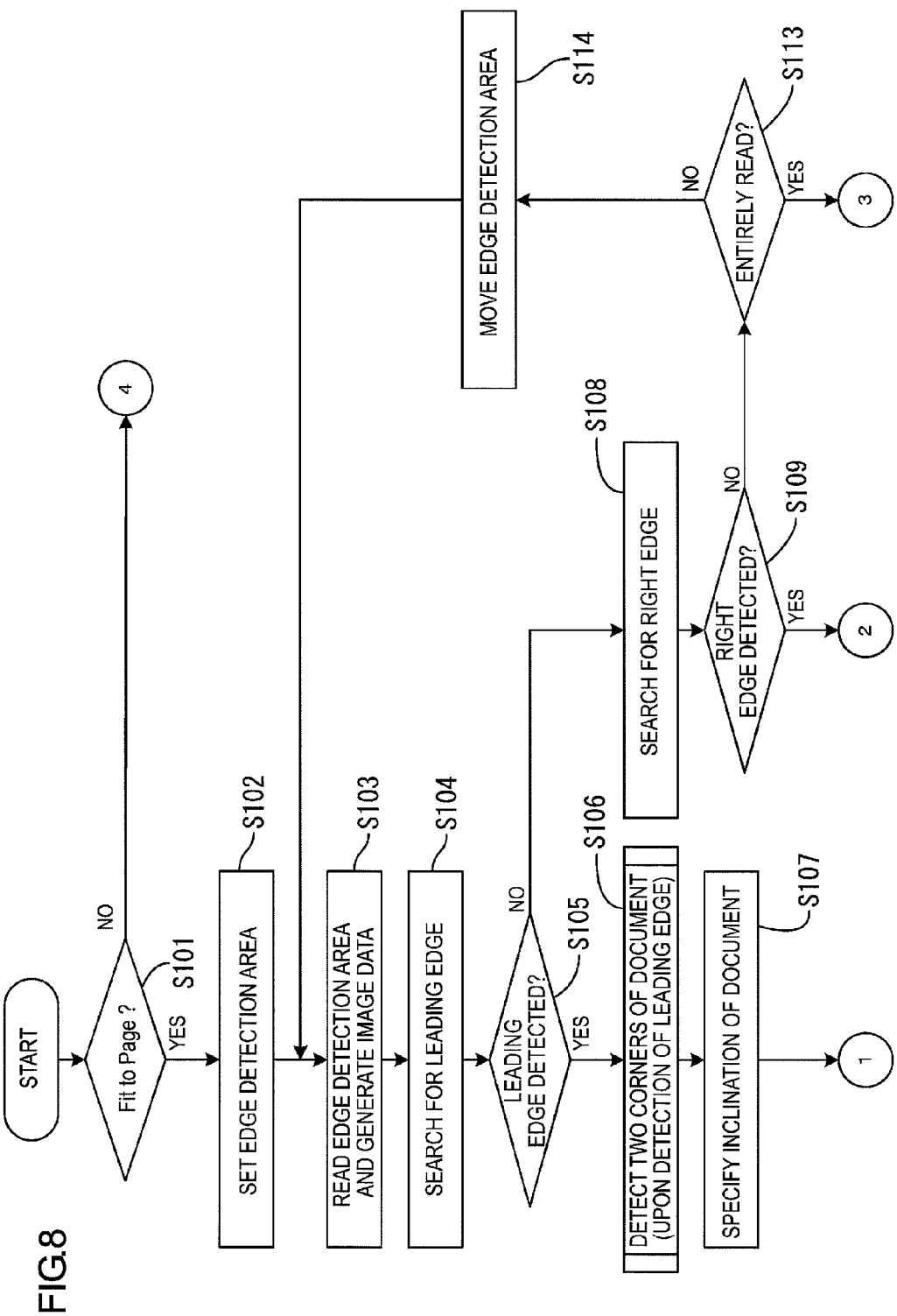
FIG. 8 is a flowchart of the illustrative aspect in accordance with the present invention.
Figure 9:
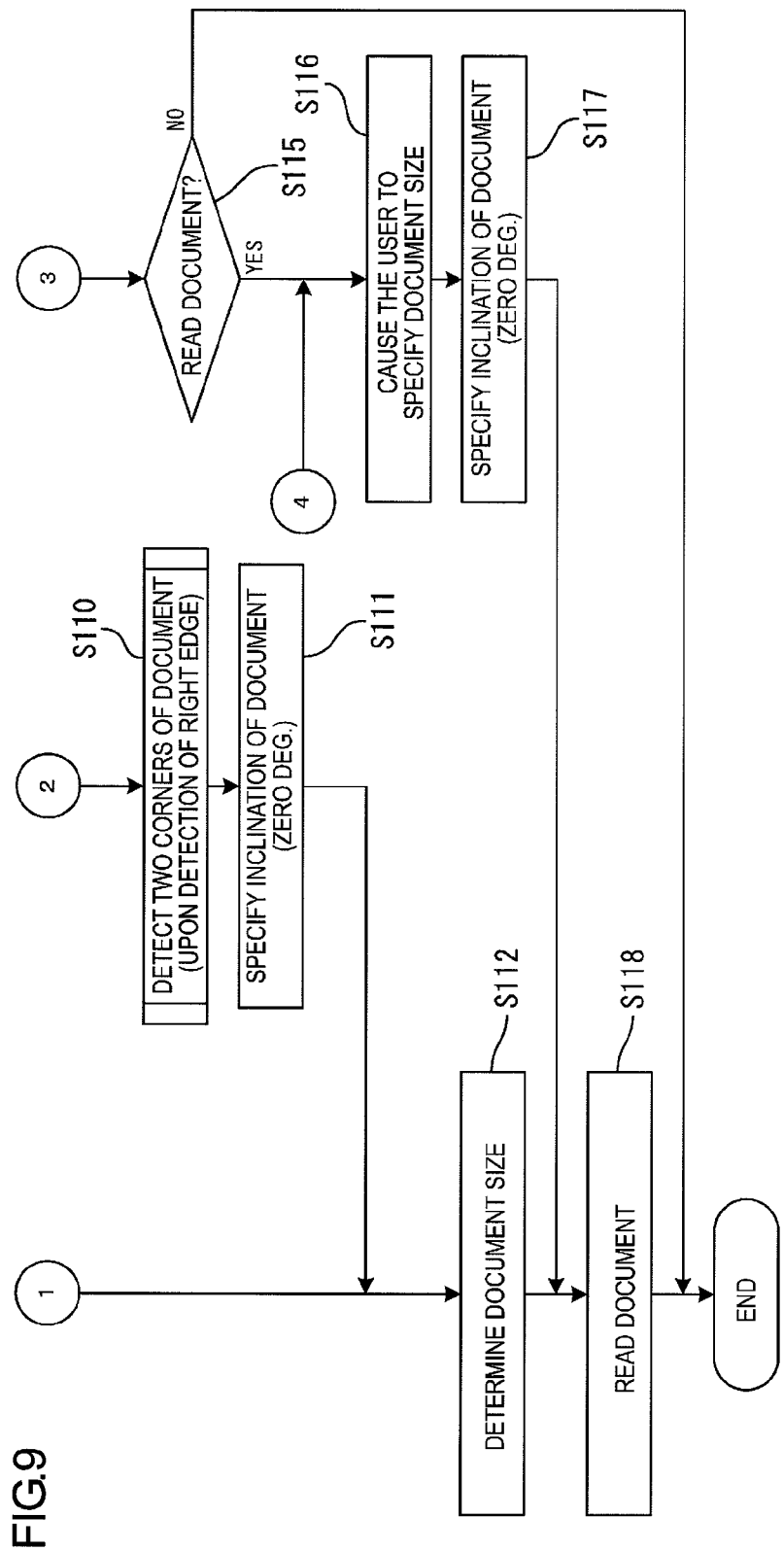
FIG. 9 is a flowchart of the illustrative aspect in accordance with the present invention.

FIGS. 8 and 9 are flowcharts illustrating the general flow of the document—size determination process. This process starts upon push of a read start button in the operating unit 27 by the user.

In S101, the CPU 24 determines whether "Fit to Page" has been set. If the "Fit to Page" has been set, the process goes to S102. If the "Fit to Page" has not been set, the process goes to S116.

In S102, the CPU 24 sets the initial position of the edge detection area 33.

Specifically, the CPU 24 sets the Y-coordinate 0 (zero) of the bottom side of the scannable area 31 to a variable YPRE_START while sets a value YPRE to a variable YPRE_END. Note that the variable YPRE_START represents a read start position, while the variable YPRE_END represents a read end position. The value YPRE is a value corresponding to the width of the edge detection area 33 in the conveying direction, i.e. a value corresponding to 3 cm. An area from this YPRE_START to YPRE_END corresponds to an initial position of the edge detection area 33.

In S103, the CPU 24 (an illustration of the partial pre-scanning device) controls each unit of the scanner to read the presently set edge detection area 33 (from YPRE_START to YPRE_END) and generate the image data.

In S104, the CPU 24 (an illustration of the detecting unit) searches the generated image data for the leading edge of the document (see (2-2) Detection of edge (edge pixels) representing side of document).

In S105, the CPU 24 determines whether the leading edge has been detected.

For Example, in Cases 1 through 3, the leading edge is determined to have been detected, while, in Case 4, the leading edge is determined not to have been detected.

If the leading edge has been detected, the process goes to S106. If the leading edge has not been detected, the process goes to S108.

Note here that, as apparent from Cases 1 through 4, in this illustrative aspect, at least one corner is detected in the case of the leading edge detected, while no corner is detected in the case of the leading edge not detected. That is, the case of the leading edge detected corresponds to the case of "detection of at least one corner of the document".

In 106, the CPU 24 executes a "process of detecting two corners of the document (upon detection of the leading edge)" so as to detect the bottom right corner and the bottom left corner of the document. Details of the "process of detecting two corners of the document (upon detection of the leading edge)" will be described below.

In S107, the CPU 24 identifies the inclination of the document on a basis of the inclination of a line segment connecting the bottom left corner and the bottom right corner.

In S108, the CPU 24 searches the right edge of the document (see (2-2) Detection of edge representing side of document) (an illustration of the detecting device).

In S109, the CPU 24 determines whether the right edge has been detected. If the right edge has been detected, the process goes to S110. If the right edge has not been detected, the process goes to S113.

Note here that, as apparent from Case 4, the case of the bottom edge not detected while the right edge detected corresponds to the case of "detection of no corner from the detected edge".

In S110, the CPU executes the "process of detecting two corners of the document (upon detection of the right edge)" so as to detect the bottom right corner and the bottom left corner of the document. The "process of detecting two corners of the document (upon detection of the right edge)" will be described below.

In S111, the CPU 24 estimates the angle of inclination of the line segment connecting the bottom left corner and the bottom right corner to be 0 (zero) deg.

In S112, the CPU 24 (an illustration of the determining device), on a supposition that the line segment connecting the detected bottom left corner and the bottom right corner is a short side of the document, determines the document size.

Note that this determination is made with reference to a table T (see FIG. 12). The table T, which is stored in the ROM in advance, indicates a relation between the document size and the line segment connecting the bottom left corner and the bottom right corner of the document. For example, if the length of the line segment is 180 mm, it corresponds to "equal to or greater than 153 mm and less than 213 mm", and accordingly, the document size is determined to be A4 size.

Note that in the case of the length of "equal to or greater than 94 mm and less than 104 mm" and "equal to or greater than 104 mm and less than 132 mm", the determined document size differs depending on the configuration. For example, in the case of the length "equal to or greater than 94 mm and less than 104 mm", if the configuration is set for use inside Japan, the document size is determined to be "postcard"; or, if the configuration is set for use inside U.S.A., the document size is determined to be "5 in. by 7 in." The similar is the case "equal to or greater than 104 mm and less than 132 mm".

In S113, the CPU 24 determines whether the scannable area 31 has been entirely read.

Specifically, if the present read end position YPRE_END is at or above the Y-coordinate of a top side of the scannable area 31, the CPU 24 determines the scannable area 31 to have been entirely read.

If the CPU 24 determines the scannable area 31 not to have been entirely read, the process goes to S114. On the other hand, if the CPU 24 determines the scannable area 31 to have been entirely read, the CPU assumes that the repeated reading while moving the edge detection area 33 has resulted in detection of no edge representing the side of the document, so that the process goes to S115.

In S114, the CPU 24 (an illustration of the partial pre-scanning device) moves the edge detection area 33 for the width YPRE of the edge detection area 33 in the conveying direction.

Specifically, the CPU 24 sets the read start position YPRE_START at the present read end position YPRE_END and adds the value YPRE, which corresponds to the width of the edge detection area 33 in the conveying direction, to the present read end position YPRE_END.

After the CPU 24 moves the edge detection area 33, the process returns to S103 to repeat the process.

In S115, the CPU 24 (an illustration of the notifying device and the selecting device) notifies the user about detection of no document size and causes the user to select whether to execute reading of the document. If the user selects execution of reading, the process goes to S116. If execution of reading is not selected, the process is terminated.

In S116, the CPU 24 (an illustration of the specifying device) causes the user to specify the document size.

In S117, the CPU 24 estimates the angle of inclination of the line segment connecting the bottom left corner and the bottom right corner to be 0 (zero) deg.

In S118, the CPU 24 identifies the area where the document is placed from the size and the inclination of the document and reads the identified area alone.

(3-2) Details of Process in S106

Figure 10:
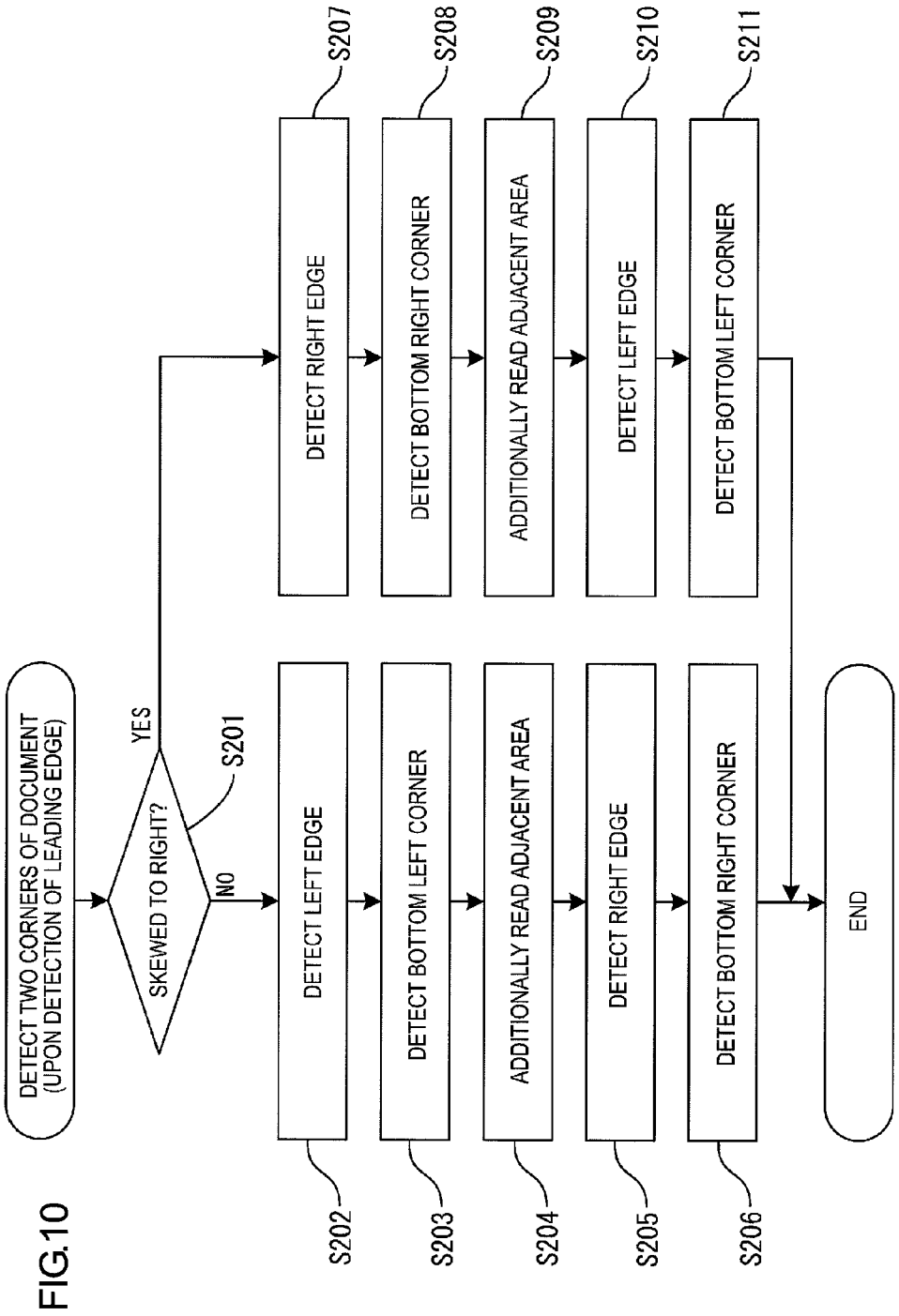
FIG. 10 is a flowchart of the illustrative aspect in accordance with the present invention.

FIG. 10 is a flowchart illustrating the "process of detecting two corners of the document (upon detection of the leading edge)", which is executed in S106.

In S201, the CPU 24 determines whether the document is inclined to the right.

Specifically, if the inclination of the straight line representing the bottom side of the document in the above-described X-Y coordinate system is minus, the CPU 24 determines the document to be inclined to the right. On the other hand, if the inclination of the straight line is equal to or greater than 0 (zero), the CPU 24 determines the document not to be inclined to the right, i.e. determines that the document is not inclined or is inclined to the left. For example, in the foregoing Case 2, the inclination of the bottom side of the document is equal to or greater than 0 (zero), and thus, the document is determined not to be inclined to the right.

If the document is not inclined to the right, the process goes to S202. If the document is inclined to the right, the process goes to S207.

In S202, the CPU 24 (an illustration of the detecting device) detects the left edge of the document (see (2-2) Detection of edge representing side of document).

In Cases 1 and 2, the left edge is detected. On the other hand, in Case 3, because the left side of the document is butted at the inner peripheral face of the left side of the frame 30, the left edge is not detected.

In S203, the CPU 24 (an illustration of the corner detecting device) detects the bottom left corner of the document.

If the left edge is detected as in Cases 1 and 2, the CPU 24 detects the intersection of the straight line obtained by the straight line approximation of the leading edge (edge pixels) and the straight line obtained by the straight-line approximation of the left edge (edge pixels) as the bottom left corner of the document. On the other hand, if the left edge is not detected as in Case 3, the CPU 24, on a supposition that the left side of the document is butted at the inner peripheral face of the left side of the frame 30, estimates the intersection of the straight line obtained by the straight-line approximation of the edge (edge pixels) representing the bottom side of the document and the left side of the frame 30 to be the bottom left corner of the document.

In S204, the CPU 24 (an illustration of the partial prescanning device) additionally reads the area that is adjacent to the present edge detection area 33 and has not been read.

In S205, the CPU (an illustration of the detecting device) detects the right edge of the document (see (2-2) Detection of edge representing side of document).

In S206, the CPU 24 (an illustration of the corner detecting device) detects the intersection of the straight line obtained by the straight-line approximation of the leading edge (edge pixels) and the straight line obtained by the straight-line approximation of the right edge (edge pixels) as the bottom right corner of the document.

The process from S207 to 5211 is the process in the case of the document inclined to the right. This process is substantially identical with the process of S202 to S206 excepting that the right and the left replace each other, and therefore, the detailed description is omitted.

(3-3) Details of Process in S110

Figure 11:
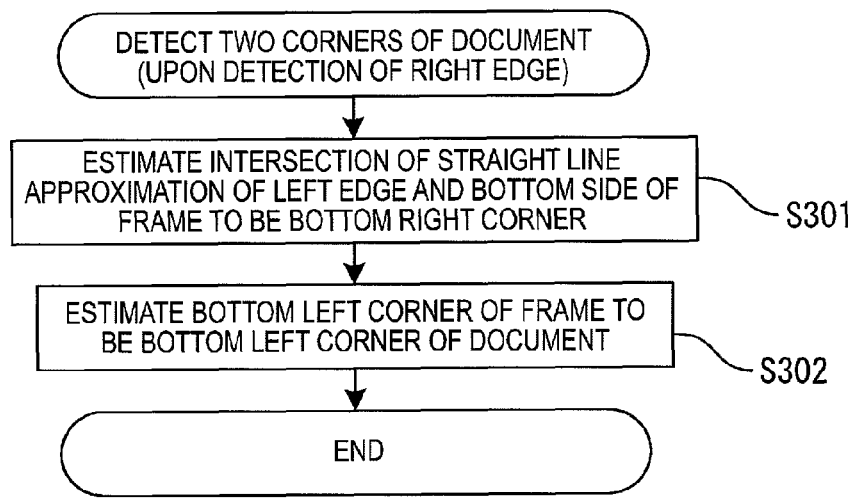
FIG. 11 is a flowchart of the illustrative aspect in accordance with the present invention.

FIG. 11 is a flowchart illustrating a flow of the "process of detecting two corners of the document (upon detection of the right edge)", which is executed in S110.

In S301, the CPU 24 (an illustration of the corner detecting device), on an assumption that the bottom side of the document is butted at the bottom side of the frame 30, assumes the intersection of the straight line obtained by the straight-line approximation of the right edge (edge pixels) and the bottom side of the frame 30 to be the bottom right corner of the document.

In S302, the CPU 24 (an illustration of the corner detecting device), on an assumption that the bottom side of the document is butted at the bottom side of the frame 30 while the left side of the document is butted at the left side of the frame 30, assumes the bottom left corner to be the bottom left corner of the document.

(4) Effects of Illustrative Aspect

Thus, in the case where the document is placed in the position apart from the end of the platen glass 12 and, because of this, no edge is detected by reading of the edge detection area 33, the above-described image scanner 1 of this illustrative aspect in accordance with the present invention can determine the document size by repeating reading while moving the edge detection area 33 until the edge is detected.

Furthermore, the image scanner 1 does not have to include any two-dimensional imaging element. Therefore, the image scanner 1 can determine the size with the simpler structure.

Thus, the image scanner 1 can determine the document size with the simpler configuration even when the document is placed in a position apart from the end of the platen glass 12.

Furthermore, the image scanner 1 can determine the document size by detecting the two corners of the document and on a basis of the two corners.

Furthermore, because the image scanner 1 additionally reads the adjacent unread area in the case of detection of the at least one corner, the possibility of detecting the other corner is higher.

Furthermore, the image scanner 1, when additionally reading the unread area, reads the area that is located within the width of the edge detection area 33 in the conveying direction of the reading unit from the detected corner. Therefore, the possibility of detecting the other corner while additionally reading less area is higher.

Furthermore, in the case where only the area (the scannable area 31) apart inwardly from the inner peripheral face of the frame 30 is scannable, in the case of the side of the document butted at the inner peripheral face of the frame 30, the image scanner 1 can detect the at least one corner by estimating the intersection of the frame 30 and the straight line obtained by the straight-line approximation of the detected edge (edge pixels).

Furthermore, in the case of detection of no edge through repeated reading while moving the edge detection area 33, the user can select whether to execute reading. Therefore, the image scanner 1 can execute reading also in the case of detection of no edge corresponding to one side of the document.

Furthermore, in the case where no edge corresponding to one side of the document is detected and, accordingly, the document size cannot be determined, the user of the image scanner 1 can specify the size.

<Other Illustrative Aspects>

The present invention is not limited to the foregoing illustrative aspect described with reference to the drawings. For example, following illustrative aspects are also included within the scope of the present invention.

(1) In the illustratively described case in the foregoing illustrative aspect, the area adjacent to the edge detection area 33 is always additionally read upon detection of the at least one corner of the document. However, there is also a case as of Case 1 where two corners are detected within the read edge detection area. Accordingly, the additional reading may be operated only upon detection of one corner and no other corner of the document.

(2) For easier comprehension, the foregoing illustrative aspect is described excepting the cases illustrated in FIGS. 7A through 7C. Where the cases illustrated in FIGS. 7A through 7C can occur, the flowchart may be modified as required.

For example, in the case where neither of the leading edge nor the right edge is detected while the left edge is detected as illustrated in FIG. 7A, it may be estimated such as follows: the intersection of the straight line obtained by a straight-line approximation of the detected left edges and the bottom side of the frame 30 is the bottom left corner of the document; and the bottom right corner of the frame 30 is the bottom right corner of the document. In this case, it is only necessary to modify the "right edge" in S108 and S109 in the flowchart illustrated in FIG. 8 into the "left edge".

Furthermore, in the case where, for example, the leading edge is not detected while the right and the left edges are detected as illustrated in FIG. 7B, it may be estimated such as follows: the intersection of the straight line obtained by the straight-line approximation of the left edge (edge pixels) and the bottom side of the frame 30 is the bottom left corner of the document; and the intersection of the straight line obtained by the straight-line approximation of the right edge (edge pixels) and the bottom side of the frame 30 is the bottom right corner of the document. Note that, in this case, the document size can be specified from the distance between the right edge and the left edge, and accordingly, the two corners of the document do not necessarily have to be detected.

Furthermore, in the case of detection of the leading edge alone as illustrated in FIG. 7C, it may be estimated such as follows on an assumption that the right and the left sides of the document are outside the scannable area 31: the intersection of the straight line obtained by the straight-line approximation of the leading edge (edge pixels) and the left side of the frame 30 is the bottom left corner of the document; and the intersection of this straight line and the right side of the frame 30 is the bottom right corner of the document.

(3) While the image scanner 1 illustratively described in the foregoing illustrative aspect can read only the area (the scannable area 31) 3 mm apart inwardly from the inter peripheral face of the frame 30, the present invention may be adopted to an image reading apparatus that can read the entire area inside frame 30.

(4) While the image reading apparatus is illustratively described as the image scanner 1 in the foregoing illustrative aspect, the present invention may be adopted to a so-called multifunction printer having a scanner function, a printer function, a copy function, and a facsimile function.

What is claimed is:

1. An image reading apparatus comprising:
a platen on which a document to be scanned is placed;
a reading unit configured to obtain image data in a scannable area on the platen;
a conveying mechanism configured to convey the reading unit in a predetermined direction; and
a controller configured to:
set an edge detection area in a part of the scannable area adjacent to the reading unit, the edge detection area having a dimension measuring in the predetermined direction smaller than one of multiple sections of another dimension of the scannable area measuring in the predetermined direction;
control the conveying mechanism to convey the reading unit in the predetermined direction to the edge detection area;
control the reading unit to obtain the image data in the edge detection area;
detect a leading edge of the document based on the image data obtained by the reading unit, the leading edge being located the closest to the reading unit among edges of the document before the conveying mechanism starts conveying the reading unit in the predetermined direction;
terminate the detection of a leading edge of the document if the leading edge is detected;
move the edge detection area by the dimension thereof measuring in the predetermined direction if no edge is detected;
repeat the control of the conveying mechanism and the reading unit to obtain image data in the moved edge detection area, the moving of the edge detection area, and the detection of a leading edge of the document until a leading edge is detected; and
determine a document size based on the detected leading edge.

2. The image reading apparatus according to claim 1 further comprising a corner detecting device configured to detect two corners of the document on a basis of the plurality of edge pixels detected by the detecting device,
wherein the determining device determines the size of the document on a basis of the two corners detected by the corner detecting device.

3. The image reading apparatus according to claim 2, wherein:
upon detection of at least one corner of the document by the corner detecting device, the partial pre-scanning device causes the reading unit to execute the reading operation so as to additionally read an area that is adjacent to the edge detection area and has not been read;
the detecting device detects the plurality of edge pixels representing the side of the document on a basis of an image data outputted by the reading unit that has read the area added by the partial pre-scanning device; and
the corner detecting device detects the other corner of the document on a basis of the plurality of edge pixels detected by the detecting device.

4. The image reading apparatus according to claim 3, wherein:
the partial pre-scanning device causes the reading unit to execute the reading operation so as to additionally read an area that is located within a width of the edge detection area in the conveying direction of the reading unit from the one corner detected by the corner detecting device and has not been read.

5. The image reading apparatus according to claim 2 further comprising a frame having an inner peripheral face, wherein:
the side of the document is butted at the inner peripheral face so that the document is positioned on the platen;
the partial pre-scanning device causes the reading unit to execute the reading operation so as to read only an area that is inwardly apart from the inner peripheral face on the platen; and
upon detection of no corner from the plurality of edge pixels detected by the detecting device, the corner detecting device estimates an intersection to be the corner of the document, the intersection being of a line obtained by a straight-line approximation of the detected plurality of edge pixels and the frame.

6. The image reading apparatus according to claim 1 further comprising:
a notifying device configured to notify of detection of no size of the document upon non-detection of the plurality of edge pixels by the detecting device;
a selecting device configured to select whether to read the document on a basis of the notification of the notifying device; and
a specifying device configured to specify the size of the document upon selection to read the document by the selecting device,
wherein the reading unit reads an area corresponding to the size specified by the specifying device.

7. The image reading apparatus according to claim 1, wherein the controller is further configured to:
control the reading unit to scan the document;
detect the edge of the document based on the image data obtained during the scan of the document; and
determine the document size during the scan of the document.

* * * * *